United States Patent
Sonderegger

[11] Patent Number: 6,112,600
[45] Date of Patent: Sep. 5, 2000

[54] MEASURING PLATFORM FOR WEIGHT AND BRAKE SYSTEM MONITORING

[75] Inventor: Hans Conrad Sonderegger, Neftenbach, Switzerland

[73] Assignee: K.K. Holding AG, Winterthur, Switzerland

[21] Appl. No.: 09/022,035

[22] Filed: Feb. 11, 1998

[30] Foreign Application Priority Data

Feb. 25, 1997 [CH] Switzerland .............. 19970436/97

[51] Int. Cl.[7] .................................................. G01L 5/00
[52] U.S. Cl. .......................... 73/841; 73/1.15; 73/774; 73/781; 73/855; 177/136; 340/933
[58] Field of Search .................. 73/1.15, 763, 774, 73/781, 786, 855, 862.642, 862.625, 815, 841, 842, 843; 177/133, 134, 136, 139, 141, 211; 340/463, 933

[56] References Cited

U.S. PATENT DOCUMENTS

| | | |
|---|---|---|
| 4,799,381 | 1/1989 | Tromp . |
| 4,979,454 | 12/1990 | Wolfer et al. . |
| 5,002,141 | 3/1991 | Loshbough et al. . |
| 5,265,481 | 11/1993 | Sonderegger et al. ............. 73/862.625 |
| 5,448,232 | 9/1995 | Tyburski ................................ 340/933 |
| 5,450,077 | 9/1995 | Tyburski ................................ 340/933 |
| 5,461,924 | 10/1995 | Calderara et al. . |
| 5,501,111 | 3/1996 | Sonderegger et al. . |
| 5,554,907 | 9/1996 | Dixon ..................................... 340/933 |
| 5,571,961 | 11/1996 | Gassner et al. ......................... 73/146 |
| 5,641,900 | 6/1997 | Di Bernardo et al. ................. 73/146 |
| 5,979,230 | 11/1999 | Balsarotti . |

FOREIGN PATENT DOCUMENTS

| | | |
|---|---|---|
| 0 342 253 | 11/1989 | European Pat. Off. . |
| 0 491 655 | 6/1992 | European Pat. Off. . |
| 9411072 | 10/1994 | Germany . |

*Primary Examiner*—Eric S. McCall
*Attorney, Agent, or Firm*—Barnes & Thornburg

[57] ABSTRACT

The measuring platform according to the invention, for recessing into road surfaces, consists of a base plate and cover plate supported in cross section on two supporting points fitted with piezoelectric shear crystals, enabling the shear force of an overrunning wheel to be measured. If the supporting points are equipped with piezoelectric pressure crystals, it is possible to measure the axle load with the same platform arrangement. This offers new possibilities, especially on or after gradients, for verifying the functional efficiency of braking and ABS systems and taking out of service vehicles with defective braking equipment.

18 Claims, 3 Drawing Sheets

MEASURING PLATFORM FOR WEIGHT AND BRAKE SYSTEM MONITORING

BACKGROUND AND SUMMARY OF THE INVENTION

In heavy goods traffic, especially on roads with gradients, goods vehicles keep having serious accidents due to brake failures. In the U.S.A. alone there are more than 10 000 accidents of this kind each year.

In various countries, after longer gradients so-called run-out tracks are provided beside the roadway, onto which vehicles may be diverted in an emergency to run out on sand without causing damage.

In nearly all such accidents the vehicle is either overloaded, or travellig too fast, or its braking systems have been badly maintained. To analyze the causes of an accident, three variables must be known:

travelling speed axle loads braking power and its distribution between the individual wheels.

For the first of the three components—travelling speed—there are numerous measuring instruments available commercially today. For the second one likewise—axle load—there are static or so-called WIM (weight in motion) measuring systems capable of monitoring the traffic and, installed on flat stretches, detecting axle loads reliably.

For the third of the three components—braking—no measuring systems have become known till today.

Hitherto the brakes of vehicles have been tested from time to time on roller test stands in garages, though this resembles only remotely the actual conditions under overheating on gradients. The reduction of the braking power as the braking elements become progressively heated is known under the technical expression 'fading'. Depending on the condition, i.e. the attention and maintenance given to the braking system, fading is more or less serious. Today no measuring system is able to detect this extremely important cause of countless accidents and thus help to combat these effectively.

The purpose of this invention is now to create for the first time a system capable of detecting the occurrence and magnitude of fading. The principal characteristic of fading is that it affects each braked wheel individually, so that the steerability of the vehicle is seriously influenced because wheel blocking may ensue at any time. Another consequence of fading is the malfunction of the ABS system now standard equipment, so that proper braking is no longer possible. The arrangement according to the invention for measuring this phenomenon consists of a measuring platform with a base plate and a cover plate, for fitting in the road surface and having between them at least two supporting points over the width of the cover plate in the direction of travel and a number of supporting points over the length of the platform transverse to the roadway. The new measuring platform is distinguished by piezoelectric crystal plates fitted in the supporting points and sustaining a thrust when the speed of a wheel changes and at the same time the axle load (F) of the wheel. The platform is fitted into the road surface so that the braking friction is measured as a shear force by the crystals in it. For this, the cover plate must be at least 50 mm (2") wide in the direction of travel, but it could also be the entire contact length of typically 250 mm with a vehicle tire. Through this contact surface of the cover plate the braking thrust is transmitted onto the measuring arrangement below, so that the signal magnitude is measured individually for each wheel.

Several of these thrust strips are disposed to advantage at defined intervals and with separate outputs for the left and right halves of the vehicles. Likewise advantageous is the alternate laying of WIM strips for detecting the axle weights. With these the vehicle speed can be detected at the same time.

So that the necessary heating of the braking parts occurs now, a brake system monitoring facility is fitted preferably after or on a gradient, so that the vehicles to be monitored have already covered a longer braking distance and the conditions exist for fading as described, and the different braking powers of the individual wheels are measured as shear forces. For this, measuring plates are required similar to those which measure the weight in motion (WIM), with the difference that these new measuring plates according to the invention measure shear forces or combinations of axle weights and shear forces.

BRIEF DESCRIPTION OF THE DRAWINGS

The invention will now be described in more detail with reference to seven figures.

DETAILED DESCRIPTION OF THE PREFERRED EMBODIMENTS

Figure 1:
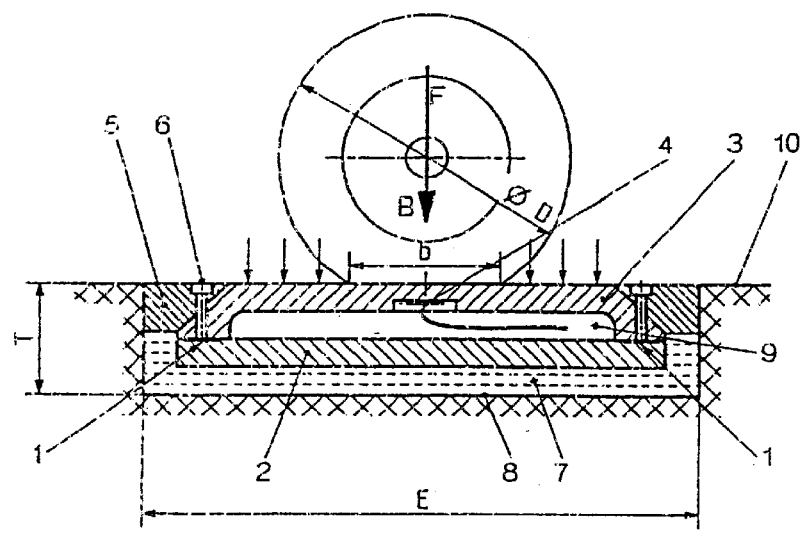
FIG. 1 shows the state of the art of a WIM flexing plate load transducer.

Familiar state of the art as in FIG. 1 are flexing plate load transducers 9 having two supporting points 1 on which a flexing plate 3 rests, with a measuring device 4 at the point of greatest flexural moment. Instead of the strain, however, some other measurand may be selected, such as the deflection. The supporting points 1 are mounted on the base plate 2. The cover strips 5 close the flexing plate 3 against the road recess 8 of width E and depth T. The flexing plate load transducer 9 is anchored in the road recess 8 by means of a pouring compound 7, so that its surface is exactly flush with the road surface 10. The width B of the flexing plate 3 in the direction of travel is usually a multiple of the tire contact width b, which is about ⅓ of the tire diameter D. Bending beam 3, base plate 2 and sealing strip 5 are screwed together with screws 6.

Such WIM flexing plate load transducers have been used in large numbers for years and have proved their worth. Hitherto, however, measuring by means of plate transducers the shear components when braking or starting has not been known.

Presented in the patent application EP-A-O 654 654 and in U.S. Pat. No. 5,461,924 is a novel tubelike sensor for shear and pressure forces, which however can measure only in shunt and only a shear moment and not a pure shear.

Figure 2:
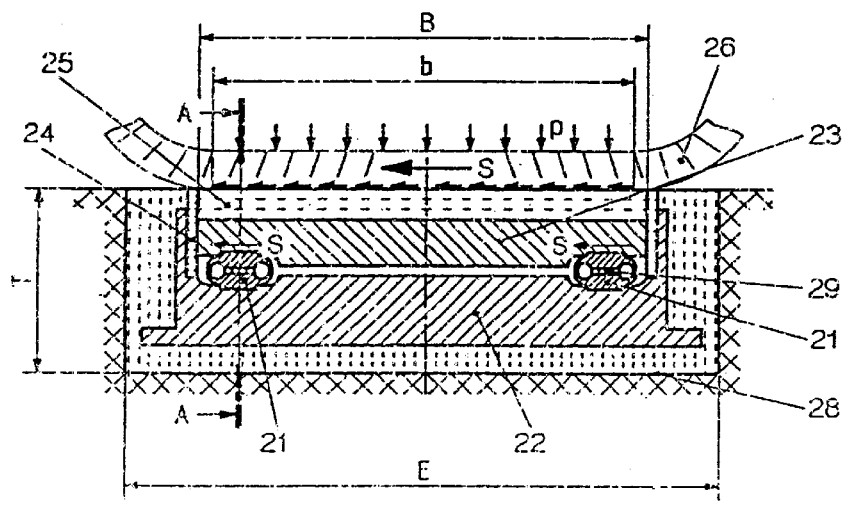
FIG. 2 shows the WIM shear plate thrust transducer in section, parallel with the direction of travel.
Figure 3:
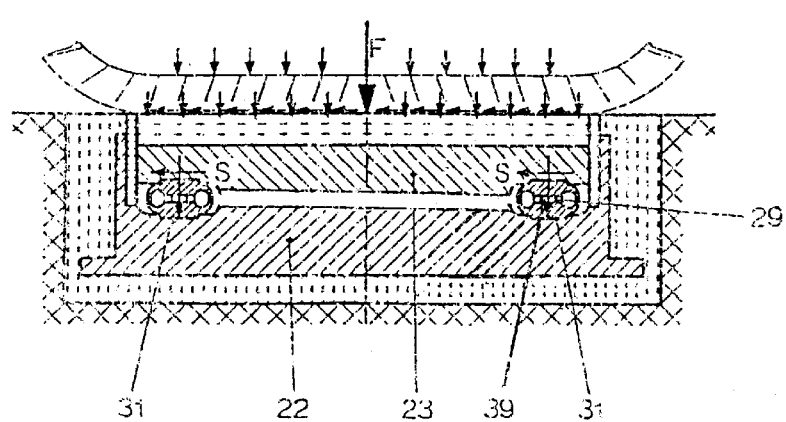
FIG. 3 shows a variant of FIG. 2 according to the invention.

The roadway measuring platform arrangement according to the invention and shown in FIG. 2 is a first measuring device capable of measuring pure shear forces and if necessary combinations of shear force and axle load, as indicated in FIG. 3. The two supporting points 21 of the cover plate 23 are supporting point sensors, fitted with shear crystals 29 which sustain the full bearing force of the wheel 26 at the same time. The cover plate 23 is made as stiff as possible, so that there is no flexure and the shear forces are transmitted as parallel as possible onto the base plate 22. Advantageously, the width B of the cover plate 23 in the direction of travel is roughly equivalent to the contract length b of the tire as shown in FIG. 2. Between the U-shaped base plate 22 and the cover plate 23 a rubber sealing strip 24 is glued in at both sides, to seal the supporting point sensors (21). Applied between the rubber sealing strips 24 on the cover plate 23 is a roadlike covering 25 (sand/epoxy) with a coefficient of friction as similar as possible to the adjoining road surface. After installation in the road recess 28 the road and covering surfaces are ground over level.

FIG. 3 shows another roadway measuring platform arrangement according to the invention. The only difference between FIGS. 2 and 3 is that the supporting point sensors 31 have both shear crystals 29 and pressure crystals 39 diposed one above the other. This enables the two components axle load F and wheel thrust S to be evaluated separately. This also allows evaluating axle weight taking into account only those weights having no braking or acceleration components and hence yielding an enhanced evaluation accuracy for axial weights. Thus with the existing parts and two different crystal sets it is possible to assemble three alternative roadway measuring platforms:

measuring platform for axle loads
measuring platform for shear force
measuring platform for axle load and shear force.

With an F/S measuring platform the curve of the friction value $\mu$ can be determined directly $\mu=S/F$.

This provides an interesting accommodation of commercial and technical requirements.

Figure 4:
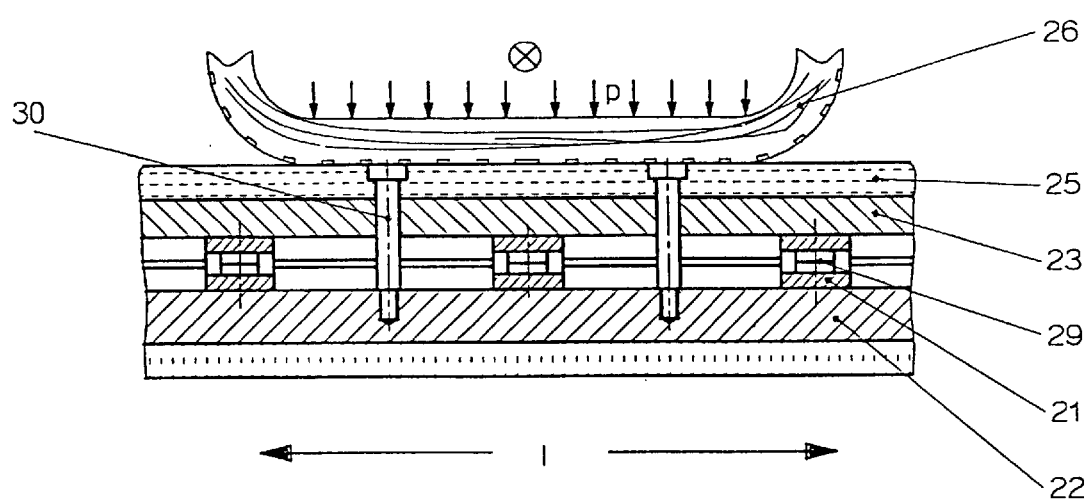
FIG. 4 shows in detail the WIM shear plate thrust transducer according to the invention as section IV—IV of FIG. 2.

FIG. 4 shows a detail from the section IV—IV in FIG. 2. The length 1 (FIG. 5) of the platform is usually half the width of the roadway, i.e. 1 to 2 m. Cover plate 23 and base plate 22 are fastened at certain intervals with screws 30. The signal lines may be placed between the cover and base plates.

Figure 5:
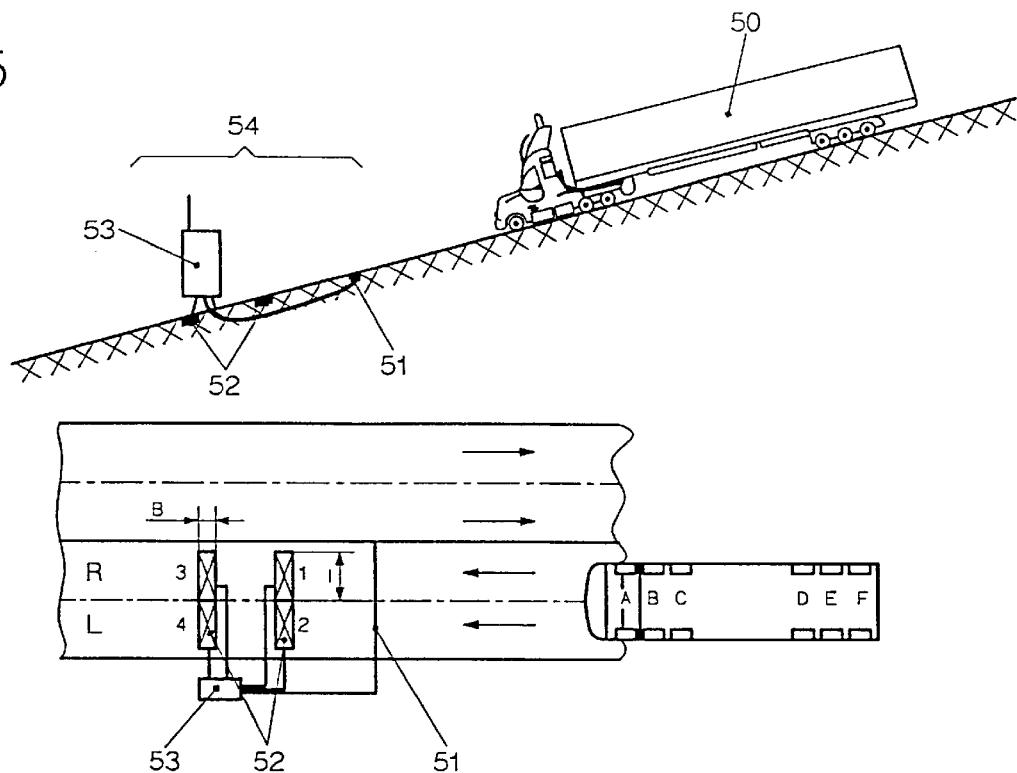
FIGS. 5A and 5B show a vehicle on a gradient approaching a measuring station, in plan and elevation respectively.

FIG. 5 shows an interesting application for measuring platforms according to the invention. Shown in elevation is a vehicle or truck 50 on a gradient approaching a braking-system monitoring facility 54. This consists of the trigger signal line 51, and four measuring platforms 52 spaced so that the left L and right R vehicle halves can be evaluated separately. Accommodated in the control cubicle 53 are the processing electronics and data transmission. With this arrangement it would be possible to have two platforms measuring shear force and two for axle force. It would then be advantageous to place the monitoring facility on a horizontal stretch of road following after the gradient.

Figure 6:
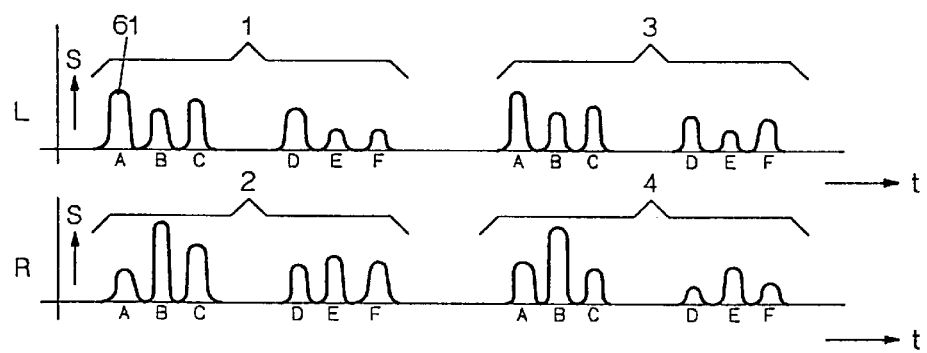
FIG. 6 plots the individual braking marks measured with the system according to FIG. 2.

FIG. 6 shows evaluation diagrams obtainable with the braking system monitoring facility of FIG. 5. For each wheel of the vehicle 50 a shear/time plot 61 results, so that 12 diagrams each are stored for the left and right sides of the vehicle after its passage. (Two platforms in succession give more reliable mean values).

Figure 7:
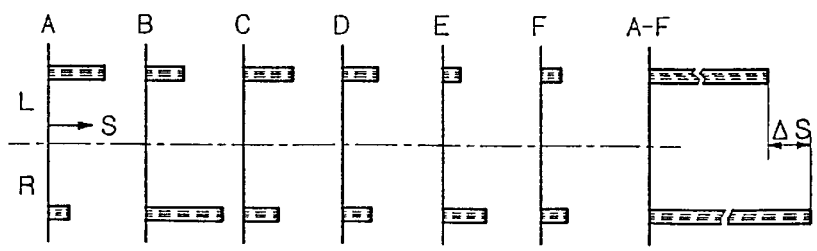
FIG. 7 shows the computer evaluation of the individual plots in FIG. 6, with the thrust of the individual wheels and the difference AS for the left/right vehicle sides.

FIG. 7 shows the maximum shear values per wheel. On the left half of the vehicle there is much less braking power $\Delta S$ than on the right for example. Big differences between wheels are evident also, pointing to a need for vehicle overhaul.

The invention thus enables measurement of a key indicator for the state of a vehicle: its braking efficiency in motion, especially on or shortly after a gradient. Hence for the first time the dreaded fading of the braking system can be detected under realistic conditions. By suitable arrangement, however, it is possible to test the ABS system also.

The combination measuring platform for axle load and shear eliminates measuring errors from WIM measurements, because errors due to acceleration or braking are recognized by the shear components, so that these measured values can be taken into account specially. For normal WIM measurements therefore a combination platform will offer advantages by excluding unrealistic data from the weight evaluation. In addition the combination measuring platform can show immediately the highly important curve of the friction coefficient $\mu$ between wheel and road.

What is claimed is:

1. A measuring platform to be recessed in road surfaces comprising a base plate and a cover plate, between the base plate and the cover plate at least two supporting points spaced over the width of the cover plate in the direction of travel and a number of supporting points arranged over the platform length transverse to the roadway, and at least two spaced-apart piezoelectric crystal plates separating the base plate and the coverplate at the two supporting points spaced in the direction of travel and measuring a shear effect when the speed of a wheel changes obtaining a shear force component between the two plates.

2. A measuring platform according to claim 1, wherein the crystal plates include shear crystals, enabling primarily braking or acceleration forces to be measured.

3. A measuring platform according to claim 1, wherein the crystal plates include pressure crystals, enabling axial weights to be measured at the same time as the shear.

4. A measuring platform according to claim 1, wherein the crystal plates are pressure and shear crystals, so that axial weights and braking or acceleration forces are measured.

5. A measuring platform according to claim 4, including means for evaluating axial weights taking into account only those weights having no braking or acceleration components and hence yielding an enhanced evaluation accuracy for axle weights.

6. A measuring platform according to claim 1 wherein the cover plate width is substantially equivalent to the contact length of a tire of the wheel.

7. A measuring platform according to claim 1, wherein the cover plate is provided with a roadlike covering comprising of a sand and epoxy mixture and having a coefficient of friction similar to the adjoining road surface.

8. A measuring platform according to claim 1, including means for direct measurement of a curve of coefficient of friction between wheel and cover plate surface.

9. A braking system monitoring facility on a gradient comprising at least one measuring platform as set forth in claim 1.

10. A testing stretch for a braking system and ABS testing disposed horizontally comprising at least one measuring platform as set forth in claim 1.

11. A testing stretch according to claim 10, including processing electronics for the measuring platform.

12. A testing stretch according to claim 10, including a trigger device connected to the processing electronics.

13. A testing stretch according to claim 10 including two measuring platforms spaced transverses to a direction of travel for measuring a shear force component caused by right and left tires of a vehicle.

14. A testing stretch according to claim 10, including processing electronics for the measuring platform.

15. A testing stretch according to claim 14, including a trigger device connected to the processing electronics.

16. A testing stretch according to claim 10 including two measuring platforms spaced transverse to a direction of travel for measuring a shear force component caused by right and left tires of a vehicle.

17. A measuring platform according to claim 1 including means for evaluating axle weights taking into account only those weights having no braking or acceleration components and hence yielding an enhanced evaluation accuracy for axial weights.

18. A measuring platform according to claim 1 wherein the cover plate is stiff.

* * * * *